United States Patent [19]
Martin

[11] B 3,983,617
[45] Oct. 5, 1976

[54] SHEET METAL PISTON FOR TRANSMISSIONS AND METHOD OF MAKING A PISTON ASSEMBLY

[75] Inventor: James R. Martin, Ypsilanti, Mich.

[73] Assignee: General Motors Corporation, Detroit, Mich.

[22] Filed: Nov. 5, 1974

[21] Appl. No.: 520,928

[44] Published under the second Trial Voluntary Protest Program on January 13, 1976 as document No. B 520,928.

Related U.S. Application Data

[62] Division of Ser. No. 394,140, Sept. 4, 1973, Pat. No. 3,914,849, which is a division of Ser. No. 288,905, Sept. 14, 1972, Pat. No. 3,848,518.

[52] U.S. Cl.............................. 29/428; 29/DIG. 37; 29/455 R
[51] Int. Cl.² ........................................ B23P 15/00
[58] Field of Search............... 29/428, 525, 156.5 R, 29/DIG. 37, 455; 92/107, 103, 108, 130, 172, 255, 240; 192/85 AA, 87.15; 277/181, 186, 187, 189; 74/763; 72/379

[56] References Cited
UNITED STATES PATENTS

| | | | |
|---|---|---|---|
| 1,494,338 | 5/1924 | Buckwalter | 277/47 |
| 1,854,455 | 4/1932 | Day | 29/156.5 R |
| 2,053,720 | 9/1936 | Huck | 92/130 |
| 2,549,818 | 4/1951 | Joy | 92/244 |
| 2,578,308 | 12/1951 | Iavelli | 92/107 |
| 2,766,864 | 10/1956 | Schilling et al. | 192/85 AA |
| 2,815,684 | 12/1957 | Roche | 74/645 |
| 3,120,156 | 2/1964 | Ayers, Jr. | 92/108 |
| 3,321,056 | 5/1967 | Winchell et al. | 192/85 R |
| 3,338,584 | 8/1967 | Nakanishi et al. | 277/186 |
| 3,370,682 | 2/1968 | McFarland | 192/85 AA |
| 3,378,111 | 4/1968 | Greer et al. | 192/85 AA |
| 3,532,030 | 10/1970 | Margetts | 29/156.5 R |
| 3,733,920 | 5/1973 | Annis | 74/763 |
| 3,782,251 | 1/1974 | LeMarchand | 92/130 |

*Primary Examiner*—C.W. Lanham
*Assistant Examiner*—Dan C. Crane
*Attorney, Agent, or Firm*—Charles R. White

[57] ABSTRACT

A multi-speed transmission with piston assemblies made from sheet metal stampings for selective engagement with multi-disc friction devices. Each piston assembly comprises a thin wall shell stamped from sheet stock. The shells have outer and inner support shoulders adjacent to outer and inner rims onto which are pressed annular retainers that form grooves for elastomeric lip seals. In one embodiment the contact member for the piston assembly comprises a sheet metal member curved until the ends almost meet. The contact member is retained in a shell by its expansion force acting against an annular retainer wall. In a second embodiment the contact member is formed by extending the outer rim axially.

3 Claims, 6 Drawing Figures

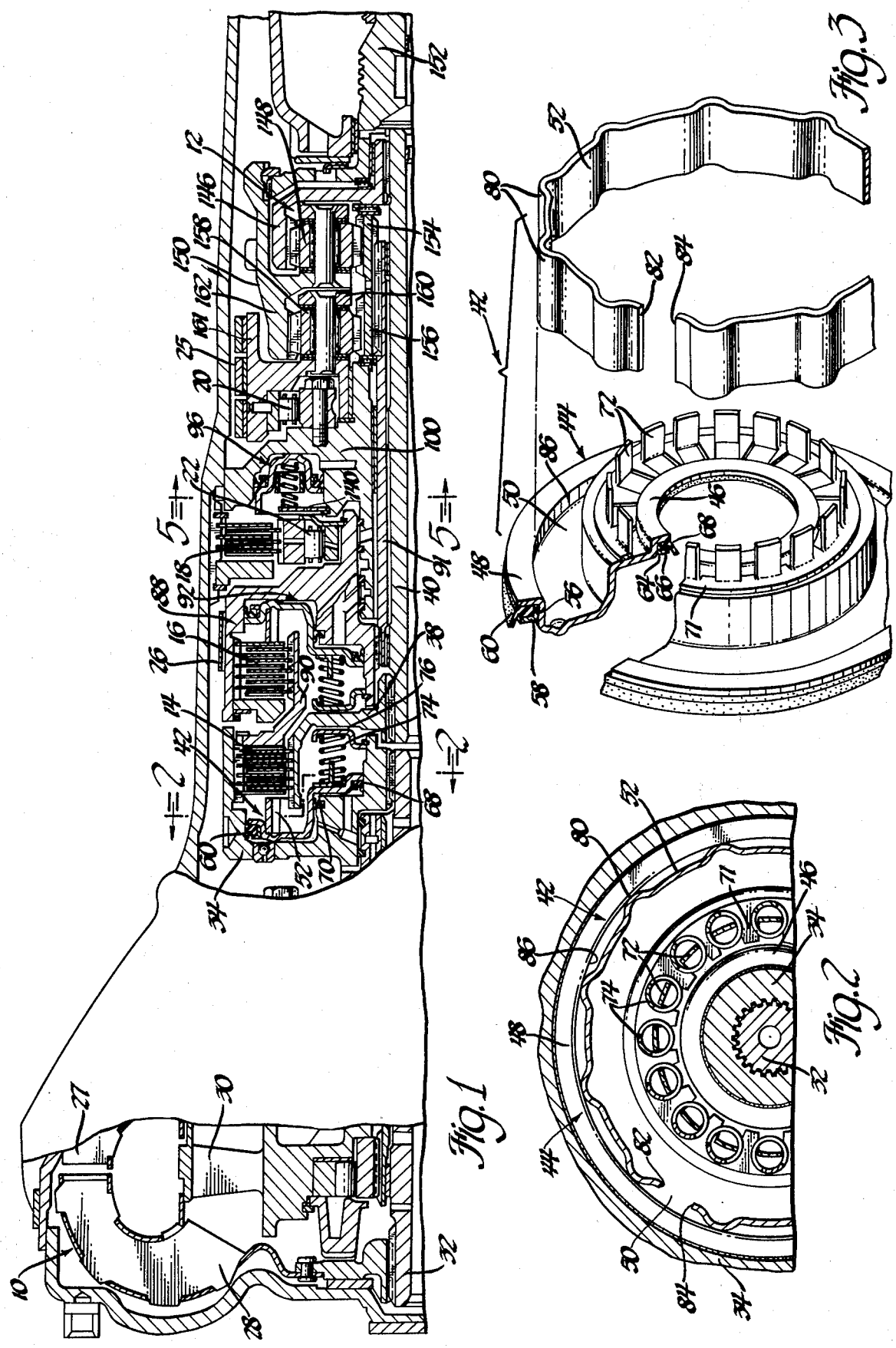

SHEET METAL PISTON FOR TRANSMISSIONS AND METHOD OF MAKING A PISTON ASSEMBLY

This is a division of Ser. No. 394,140 filed Sept. 4, 1973, now U.S. Pat. No. 3,914,849, which is a division of Ser. No. 288,905 filed Sept. 14, 1972 now U.S. Pat. No. 3,848,518 which issued Nov. 19, 1974.

This invention relates to hydraulically operated pistons for transmissions and more particularly to a new and improved sheet metal piston assembly and method for making such piston assemblies.

Many current transmissions incorporate clutch and brake-apply pistons machined from rough castings to close tolerances on most of their surfaces. This machining insures proper fit and proper operation of the piston in the transmission. To reduce cost and weight, sheet metal pistons have been utilized in some transmission designs. Some of these sheet metal pistons are disc-like diaphragms fixed at their centers to a support and having a movable outer portion provided with an annular friction surface for engagement with a clutch or brake pack. Other sheet metal pistons mounted for unitary sliding movement in a bore drum or other support have been designed. However, these later pistons are incomplete assemblies without means to support and guide the piston return spring and requiring bore mounted seals to establish piston pressure chambers. Generally these pistons are complex in construction and are not readily adaptable to current transmissions.

This invention provides new and improved stamped sheet metal pistons and a method of making such pistons. The piston has a shell-like body stamped from sheet metal with inner and outer rims. Annular inner and outer shoulders are formed on one side of the shell onto which are pressed retainers with annular walls connected to have an L-shaped cross section. In the installed position one wall makes annular contact with the piston shell to space the other wall a predetermined distance from the shell to form annular grooves to provide seal ring retaining grooves. An annular elastomeric lip seal is positioned in the inner and outer grooves to sealingly contact outer and inner walls of the piston bore.

In addition to improved sealing the stamped piston has new and improved provision for supporting return springs used to move the piston to an off position when pressure is relieved from the piston apply chamber. In a first design a spring retainer having a circular arrangement of axially extending spring retaining tabs is welded or otherwise secured to the front face of the piston. A series of springs is mounted and held on these tabs in the installed position. In a second design the face of the piston has an annular groove with offset and arcuately spaced spring pockets formed therein. A plastic spring guide fits in the annular groove and has a projection that fits in the pocket. With the projection extending into the pocket, turning movement between the guide and the piston shell is restricted. Openings formed in the projections of the spring guide passage of the springs therethrough and guide the springs into seating engagement with a plate fixed to the member supporting the piston.

In this invention there is new and improved construction for contacting the multi-plate clutch or brake pack. In one embodiment a contact ring is stamped from a flat metal blank. This blank is provided with projections extending from one side and curved into a spring-like member with the ends aligned and spaced a short distance from each other. This ring member can be constricted and loaded into the piston and then released so that its expansion force causes the projections to contact an annular wall in the faces of the piston shell to releasably hold the ring therein. This facilitates assembly and replacement of the ring if needed. In a second design the outer rim of the shell extends axially from the major portion of the shell to form the contact member.

These and other features, objects and advantages of this invention will become more apparent from the following detailed description and drawings in which:

FIG. 1 is a side view of the transmission with the transmission cover broken away in part; FIG. 2 is a sectional view taken along lines 2—2 of FIG. 1;

FIG. 3 is an exploded perspective view of the components of FIG. 2 illustrating a first embodiment of the invention;

Figure 4:
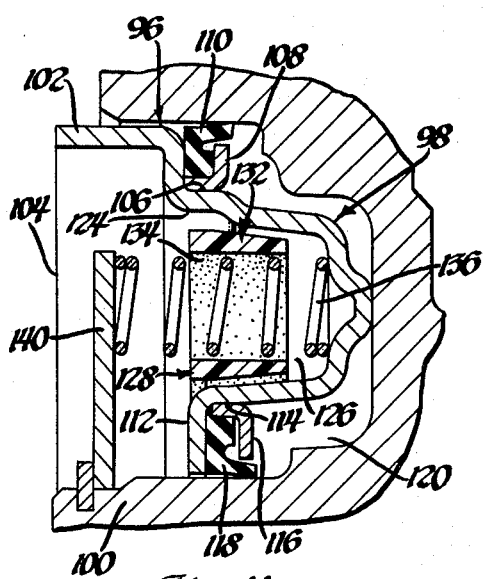
FIG. 4 is an enlarged side sectional view of a portion of FIG. 1 showing a second embodiment of the invention.
Figure 5:
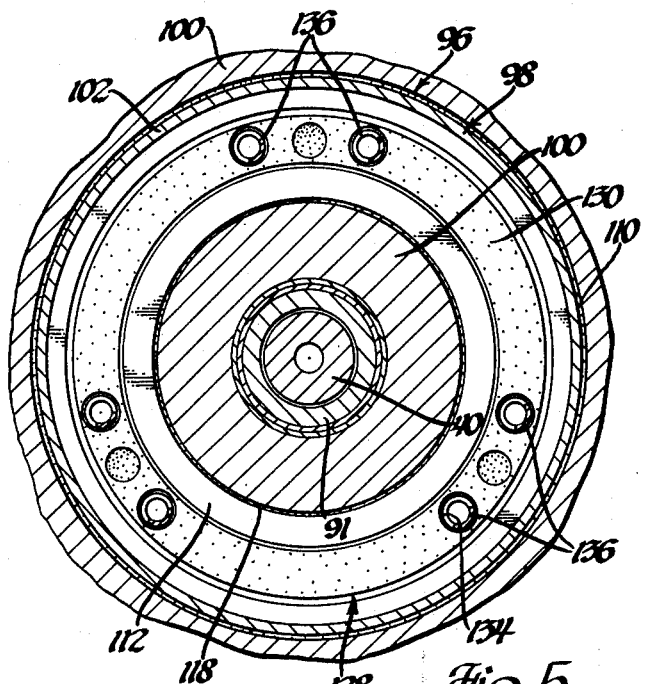
FIG. 5 is a sectional view taken generally along lines 5—5 of FIG. 1.
Figure 6:
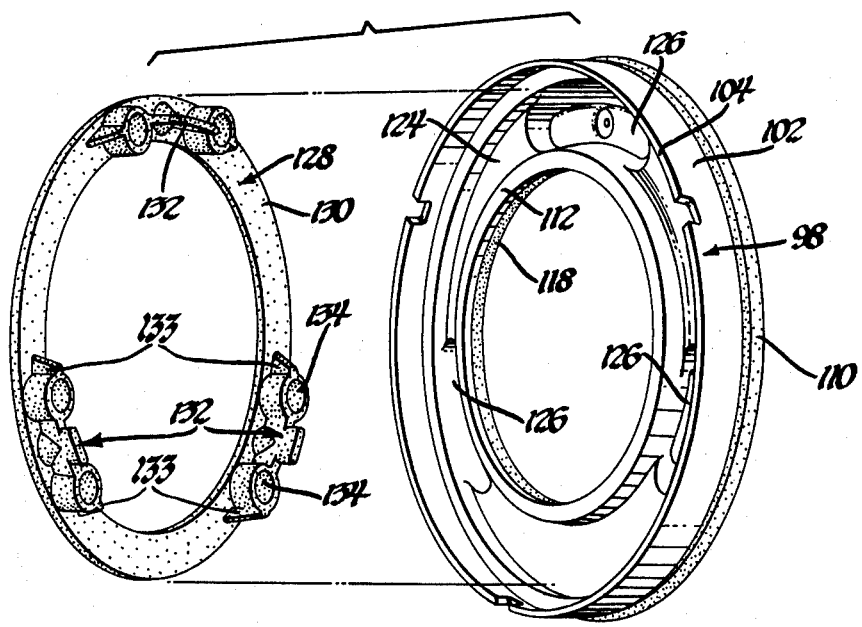
FIG. 6 is an exploded perspective view of the components of FIG. 1 to illustrate a second embodiment of the invention.

The transmission of FIG. 1 has a three element torque converter 10, a compound planetary gearset 12, two multiple disc clutches 14 and 16, a multiple-disc brake 18, two one-way brakes 20 and 22, and two band brakes 25 and 26. These clutches and brakes provide the friction elements required to selectively condition the planetary gearset 12 for three speeds forward and one speed reverse. The converter, gearing, brakes and clutches are substantially identical to corresponding elements disclosed in the U.S. Patent to Winchell et al. U.S. Pat. No. 3,321,056 issued May 23, 1967 and operate in the same manner to provide three forward drives and one reverse drive.

Torque converter 10 has an engine driven pump 27, a turbine 28 and a stator 30. Turbine 28 is drivingly connected to a turbine shaft 32 that extends longitudinally along the rotational axis of the transmission. The end of the turbine shaft is splined to a first rotatable drum 34 which houses clutch 14. As shown the drive plates of this clutch are splined to the inner wall of drum 34 and the driven plates interleaved with the drive plates are splined on the outer wall of a support 38 which in turn is splined to one end of a longitudinally extending intermediate shaft 40.

Multi-disc clutch 14 is engaged and released by a hydraulically operated piston assembly 42 mounted for longitudinal movement in drum 34. This piston assembly 42 comprises a thin-walled shell 44 stamped from sheet metal with inner and outer annular rims 46 and 48. As best shown in FIG. 3, the shell has an annular channel 50 in its face inwardly of outer rim 48 to provide space for a convoluted clutch apply ring 52. An outer annular shoulder 56 having a diameter slightly less than the diameter of outer rim 48 is formed on the back of the shell 44 onto which is press fitted an annular lip seal retainer 58 also stamped from sheet metal. As shown the retainer 58 has a longitudinally extending wall that contacts rim 48 to space a radially outwardly extending wall a predetermined distance from rim 48 to provide an annular groove for an annular elastomer lip seal 60.

The piston shell 44 also is formed with an inner annular shoulder 64 slightly greater than the inner diameter of rim 46 onto which is press fitted an annular lip seal retainer 66 also stamped from sheet metal. As shown the retainer 66 has a longitudinally extending wall that contacts rim 46 to space a radially extending wall a predetermined distance from rim 46 to provide an annular groove for an annular elastomer lip seal 68.

The outer and inner lip seals 60 and 68 provide sliding sealing contact with the walls of a bore in the drum so that a pressure chamber is formed when the piston assembly is fitted therein. In the transmission of FIG. 1 an intermediate annular lip seal 70 supported within drum 34 contacts cylindrical inner wall of the shell 44 to divide the pressure chamber into separate chambers so that clutch 14 can be engaged with high or low apply force.

A spring retainer 71, stamped from sheet metal, has a circular base portion secured by projection welding or other suitable means to the front face of the piston adjacent to inner rim 46. Retainer 71 has a series of equally spaced tabs 72 which are arranged in a circle and which extend longitudinally from its base portion. Mounted on each of the tabs is a helical piston return spring 74. The far ends of springs 74 are seated in an annular spring support 76 secured to the inner hub of drum 34. These springs provide the return force to move the piston assembly to the off position when the pressure in the pressure chamber is exhausted.

The clutch apply ring 52 is made from a flat rectangular blank of sheet metal. The rectangular blank is convoluted to provide arcuately spaced radial projections 80 and is then curled into a ring with free ends 82 and 84 spaced a short distance from each other. The front and rear edges of the ring are planar parallel surfaces. As best illustrated in FIGS. 2 and 3, the apply ring is a cylindrical spring member that can be easily constricted and loaded into the piston shell. When the ring is released, the expansion force causes the radial projections 80 to contact an annular wall 86 in shell 44 forming the outer periphery of channel 50 to thus retain the ring in the piston shell. This construction facilitates assembly or replacement of the contact ring in the piston shell.

Clutch 16 has driven plates splined to the inside of a second rotatable drum 88 and drive plates splined to a cylindrical support 90 fixed to the first drum 34. Drum 88 is splined at its hub to a sleeve shaft 91 which is drivingly connected to the sun gears of planetary gearset 12. A second hydraulically actuated piston assembly 92 is disposed for longitudinal movement in this drum to effect the engagement and release of clutch 16. This piston assembly is substantially the same as the first piston assembly 42 as shown by FIG. 1 and the detailed description of piston assembly 42 applies to piston assembly 92. Drum 88 can be held from rotation by band 26 or by multi-plate brake 18 and one way brake 22.

Multi-plate brake 18 has first discs splined to the transmission case interleaved with second discs splined to the outer race of the one way brake 22 which has its inner race fixed to drum 88. This brake is selectively engaged by a third piston assembly 96 to hold the outer race of the one way brake 22 stationary so that it can engage to hold drum 88 and the connected sun gears of the planetary gearset stationary to condition the gearset for an intermediate drive range. This piston is stamped from metal sheet stock into an annular shell 98 with a central opening to slidably fit in an annular bore or recess formed in a center support 100.

The shell 98 is formed with a forwardly extending outer cylindrical rim 102 that has a planar contact face 104 for engaging the multiple disc brake 18. Press fitted on an outer cylindrical shoulder 106 formed on the back of shell 98 is an annular lip seal retainer 108 stamped from sheet metal. This retainer is similar to retainer 56 and cooperates with shell 98 to form an annular groove for an elastomer lip seal 110. The shell 98 also has an annular radially extending inner rim 112 and an adjacent inner annular shoulder 114. An annular lip seal retainer 116 similar to retainer 66 is press fitted on this shoulder and cooperates with the inner rim 112 to form an annular groove for an elastomeric lip seal 118. The two lip seals establish pressure chamber 120 which when filled with pressure fluid causes the forward movement of the piston to engage the brake 18.

In the front face of shell 98 there is an annular channel 124 with three arcuately spaced spring pockets 126 for receiving a plastic spring guide 128. The spring guide 128 has a flat ring-like base 130 that fits in channel 124 and further has three offset projecting portions 132 that fit in the spring pockets 126. The ends 133 of each of these projecting portions contact the end walls of the pockets to limit turning movement of the guide 128 relative to the shell 98. Each projecting portion of the guide has two cylindrical openings 134 through which helical springs 136 extend. As shown the springs 136 are seated in the spring pockets 126 and extend through the corresponding spring guide opening 134 into engagement with a support plate 140 that is secured to a shoulder of center support 100. When pressure is relieved from the pressure chamber 120 the springs will move the piston back to the off position.

The compound planetary gear unit has a first gearset with an input ring gear 146 drivingly connected to the intermediate shaft 40. This ring gear meshes with planet gears 148 rotatably supported on carrier 150 which is drivingly connected to the transmission output 152. Planet gears 148 mesh with sun gear 154 which in turn is splined to the end of sleeve shaft 91 and which is drivingly connected to a sun gear 156 of a second planetary set of the planetary unit. Sun gear 156 meshes with planet gears 158 rotatably supported on a carrier 160 which is secured to a drum 161 and adapted to be held from rotation by one way brake 20 or by reverse drive band brake 29. The ring gear 162 of this gearset is drivingly connected to the output carrier 150.

The various brakes and clutches are applied as in the Winchell et al patent identified above using the stamped sheet metal pistons of this invention instead of the cast and machined pistons and without alteration of the piston bores or other components of the transmission disclosed in that patent.

While preferred methods and embodiments of the invention have been shown and described in detail to illustrate the invention, various changes and modifications may be made without departing from the scope of the invention set forth in the following claims:

I claim:

1. A method of making a sheet metal piston assembly for a friction drive establishing device comprising the steps of stamping a thin walled annular shell of substantially uniform thickness from sheet metal stock, forming inner and outer rims on said shell, seating annular elastomeric seal means on said shell adjacent to said rims for hydraulically sealing said shell in a piston bore, forming an annular axially extending channel in said shell between said rims, offsetting spaced portions of the bottom wall of said channel axially to provide pockets for piston return springs, forming a washer-like ring with spaced annular openings therein, inserting said ring into said channel, aligning said openings in said ring with said pockets in said channel, loading helical piston return springs through said openings of said ring into said spring pockets so that said springs are retained in said shell, and providing said outer rim of said shell with a contact surface for directly engaging the friction drive establishing device.

2. A method of making a piston assembly for selectively engaging a friction drive establishing device of a transmission comprising the steps of stamping a thin-walled annular shell with inner and outer annular rims from sheet metal stock, mounting first and second elastomeric lip seal means on said shell adjacent to said inner and outer rims respectively for hydraulically sealing said shell in a piston bore of a housing, forming an annular channel in said shell between said inner and outer rims, depressing arcuately spaced portions of the bottom wall of said channel to provide pockets therein, forming a ring with inner and outer diameters to fit in said annular channel and with arcuately spaced and axially extending projections to closely fit into said pockets, providing an axially extending opening in each of said projections, inserting said plastic ring into said channel and said projections into said pockets, providing a plurality of helical piston return springs, inserting each of said springs through a corresponding opening in said projections so that they are seated in said spring pockets and extend axially through said openings so that said springs are retained in said shell, providing said shell with an annular contact extending axially from said shell for directly engaging the friction drive establishing device when said piston assembly is stroked in said bore and securing a retainer plate to the housing spaced a predetermined distance from said shell, and trapping said springs between said retainer plate and said shell.

3. A method of making a piston assembly for selectively engaging a friction drive establishing device of a transmission comprising the steps of stamping a thin-walled annular shell with inner and outer annular rims from sheet metal stock, forming inner and outer annular shoulders on one side of said shell adjacent to said inner and outer annular rims respectively, stamping lip seal retainer rings from sheet metal, mounting one of said rings on said inner shoulder to form a first annular groove, mounting another of said rings on said outer shoulder to form a second annular groove mounting first and second elastomeric lip seal means in said first and second annular grooves respectively and adjacent to said inner and outer rims for hydraulically sealing said shell in a piston bore in a housing in a transmission, forming an annular channel in said shell between said inner and outer rims, depressing arcuately spaced portions of the bottom wall of said channel to provide axially offset pockets therein, forming a plastic material into a ring with inner and outer diameters to fit in said annular channel and with a plurality of arcuately spaced and axially extending projections to closely fit into said pockets, providing a pair of axially extending openings in each of said projections, inserting said plastic ring into said channel and said projections into said pockets, providing a plurality of helical piston return springs, inserting each of said springs through a corresponding opening in said ring so that they are seated in said spring pockets and extend axially through said openings so that said springs are retained in said shell, axially bending said outer rim of said shell to form an annular axially extending contact means for directly engaging the friction drive establishing device when said piston assembly is stroked in its bore, and securing a retainer plate to the housing axially spaced a predetermined distance from said shell, and trapping said springs between said retainer plate and said shell so that said piston assembly can be moved away from said friction drive establishing device after contact therewith.

* * * * *